United States Patent
Wolfson et al.

(10) Patent No.: US 11,455,405 B2
(45) Date of Patent: Sep. 27, 2022

(54) OPTIMIZING DOCKER IMAGE ENCRYPTION—TRADEOFF BETWEEN PERFORMANCE AND PROTECTION LEVEL

(71) Applicant: EMC IP Holding Company LLC, Hopkinton, MA (US)

(72) Inventors: Kfir Wolfson, Beer Sheva (IL); Jehuda Shemer, Kfar Saba (IL); Stav Sapir, Beer Sheva (IL); Amos Zamir, Beer Sheva (IL); Naor Radami, Beer Sheva (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 138 days.

(21) Appl. No.: 16/987,979

(22) Filed: Aug. 7, 2020

(65) Prior Publication Data
US 2022/0043916 A1  Feb. 10, 2022

(51) Int. Cl.
| | | |
|---|---|---|
| G06F 11/30 | (2006.01) | |
| G06F 21/60 | (2013.01) | |
| G06F 21/62 | (2013.01) | |
| G06F 8/61 | (2018.01) | |
| G06F 21/78 | (2013.01) | |
| G06F 12/14 | (2006.01) | |

(52) U.S. Cl.
CPC ............. *G06F 21/602* (2013.01); *G06F 8/63* (2013.01); *G06F 21/6281* (2013.01); *G06F 21/78* (2013.01); *G06F 2221/2107* (2013.01)

(58) Field of Classification Search
CPC .... G06F 21/602; G06F 21/6281; G06F 21/78; G06F 2221/2107; G06F 8/63
See application file for complete search history.

(56) References Cited

U.S. PATENT DOCUMENTS

| | | | | |
|---|---|---|---|---|
| 6,954,532 | B1 * | 10/2005 | Handley | ............ H04N 1/32144 380/54 |
| 9,594,514 | B1 * | 3/2017 | Bono | ..................... G06F 3/0679 |
| 9,697,241 | B1 * | 7/2017 | Mistry | ..................... G06F 16/27 |
| 9,703,965 | B1 * | 7/2017 | Robinson | ............. H04L 63/123 |
| 9,930,115 | B1 * | 3/2018 | Wallner | ............. H04L 67/1095 |
| 9,983,909 | B1 * | 5/2018 | Tyde, III | ............... G06F 9/5072 |
| 10,032,032 | B2 * | 7/2018 | Suarez | .................. G06F 21/562 |
| 10,044,640 | B1 * | 8/2018 | Levine | .................. H04L 47/827 |

(Continued)

FOREIGN PATENT DOCUMENTS

WO  2019/149797 A1  8/2019

OTHER PUBLICATIONS

Extended European Search Report received for EP Patent Application No. 21194796.5, dated Jan. 31, 2022, 8 pages.

(Continued)

*Primary Examiner* — Gary S Gracia
(74) *Attorney, Agent, or Firm* — Workman Nydegger

(57) ABSTRACT

One example method includes inserting a signal layer in an image, the signal layer indicating that a sensitive layer in the image is a candidate for encryption, creating a single layer archive file that includes the sensitive layer, encrypting the single layer archive file to create an encrypted layer, constructing a new image that includes the encrypted layer, inserting, in the new image, a decryptor layer that is operable to decrypt the encrypted layer, and designating the decryptor layer as an entry point of the new image.

20 Claims, 4 Drawing Sheets

(56) References Cited

U.S. PATENT DOCUMENTS

| | | | | |
|---|---|---|---|---|
| 10,061,520 | B1* | 8/2018 | Zhao | G06F 3/0611 |
| 10,089,035 | B1* | 10/2018 | Bono | G06F 3/0619 |
| 10,089,037 | B1* | 10/2018 | Bono | G06F 3/0634 |
| 10,152,481 | B1* | 12/2018 | Singh | G06F 16/182 |
| 10,291,706 | B1* | 5/2019 | Zhao | H04L 67/1097 |
| 10,326,744 | B1* | 6/2019 | Nossik | G06F 9/45558 |
| 10,356,169 | B1* | 7/2019 | Mistry | H04L 67/10 |
| 10,409,693 | B1* | 9/2019 | Liang | G06F 16/164 |
| 10,437,622 | B1* | 10/2019 | Chalmer | G06F 9/45558 |
| 10,469,574 | B1* | 11/2019 | Dai | H04L 67/1095 |
| 10,534,671 | B1* | 1/2020 | Zhao | G06F 9/45558 |
| 10,659,329 | B1* | 5/2020 | Zhao | H04L 43/08 |
| 10,659,533 | B1* | 5/2020 | Zhao | G06F 12/0862 |
| 10,691,613 | B1* | 6/2020 | Tong | G06F 12/0868 |
| 10,698,925 | B1* | 6/2020 | Zhao | G06F 9/455 |
| 11,314,443 | B2* | 4/2022 | Chen | G06F 3/0653 |
| 2013/0173927 | A1* | 7/2013 | Tian | G06V 40/1371 |
| | | | | 713/186 |
| 2017/0177877 | A1* | 6/2017 | Suarez | G06F 16/2455 |
| 2018/0124055 | A1 | 5/2018 | Chen et al. | |
| 2018/0255075 | A1* | 9/2018 | Brugger | H04L 63/101 |
| 2019/0171907 | A1* | 6/2019 | Li | G06F 16/51 |
| 2019/0213319 | A1* | 7/2019 | Gerebe | H04L 63/12 |
| 2019/0251278 | A1 | 8/2019 | Kalinichenko et al. | |
| 2019/0354389 | A1 | 11/2019 | Du et al. | |
| 2020/0250319 | A1* | 8/2020 | Bacher | G06F 16/116 |
| 2022/0012373 | A1 | 1/2022 | Kulkarni et al. | |
| 2022/0043916 | A1* | 2/2022 | Wolfson | G06F 21/602 |
| 2022/0092192 | A1* | 3/2022 | Wolfson | G06F 9/45545 |

OTHER PUBLICATIONS

Giannakopoulos I. et al., "Isolation in Docker through Layer Encryption," Proceedings of the International Conference on Distributed Computing Systems, Jun. 2017, pp. 2529-2532.

* cited by examiner

OPTIMIZING DOCKER IMAGE ENCRYPTION—TRADEOFF BETWEEN PERFORMANCE AND PROTECTION LEVEL

FIELD OF THE INVENTION

Embodiments of the present invention generally relate to containerized applications. More particularly, at least some embodiments of the invention relate to systems, hardware, software, computer-readable media, and methods for a focused encryption of container images.

BACKGROUND

An image, such as a Docker image, is a composition of files that build up a single image that can be instantiated and run in an engine, such as a Docker engine. A specific instance of an image, which can be thought of as a template, may be referred to as a container. The files of an image may be divided into logical layers that are defined in a special file that may be referred to, in the case of the Docker container service, as a Dockerfile. The files in each layer are readable to anyone who is able to access the image. However, this may impose a threat to any sensitive data inside one of the layers within an image.

While the image could be encrypted to protect the sensitive data from being read when the container is at rest, such an approach may be problematic. For example, the entire image may be encrypted and transported as a 'blob' to a deployment site. However, this approach introduces management and performance issues. For example, container startup time is impacted when an instance is instantiated, since the full encrypted image could be quite large. Another problem with the solution of encrypting the image, is that the deployment environment would have to be modified to support image decryption. Finally, performing the decryption may take a relatively long time, depending on the image size, and may also impact performance of other elements in environments that have heavy deployment scenarios.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
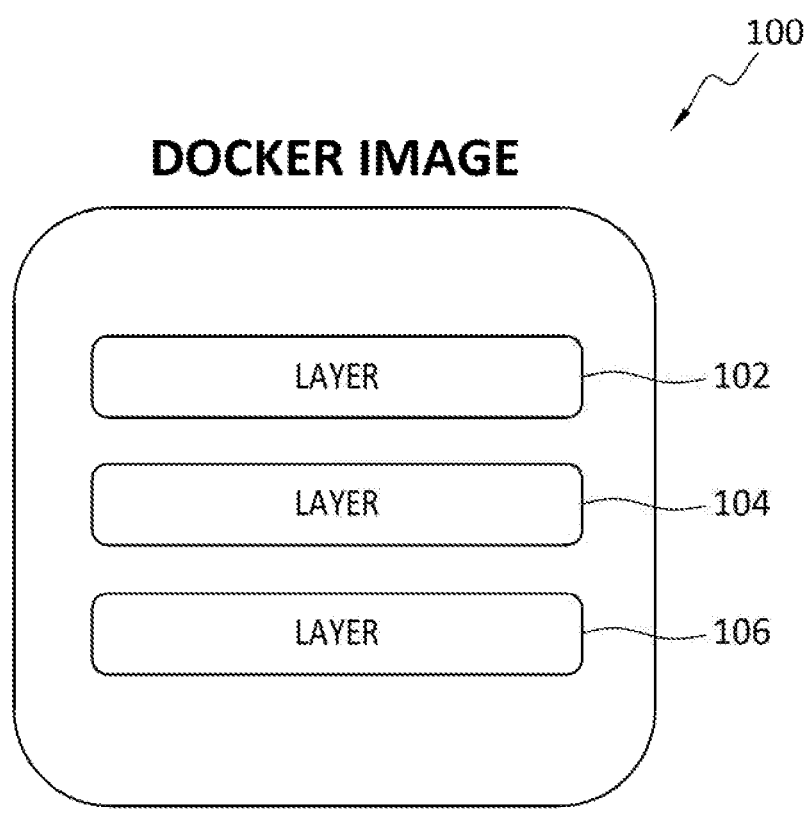
FIG. 1 discloses aspects of an example image.

Embodiments of the present invention generally relate to containerized applications. More particularly, at least some embodiments of the invention relate to systems, hardware, software, computer-readable media, and methods for a focused encryption of container images.

In general, example embodiments of the invention embrace an image encryption process that may encrypt only the sensitive data inside the image. The sensitive data layers may be combined into a single layer that is then encrypted, and stored encrypted while at rest. Embodiments of the invention may also provide for adding a decryptor to an image, possibly as a final step in some embodiments, and then running the decryption before the application runs, so that the decryption process may take place at run-time and before the original application runs. The encryption and decryption processes may be significantly shorter than if an entire image were to be encrypted and decrypted. Thus, there may be no need to make any changes in the deployment process or deployment environment, with the possible exception of some relatively minor configuration changes, and secret sharing. As well, example embodiments may provide for processes and mechanisms by way of which the layers of an image file to be protected may be readily selected and encrypted. In this way, it may be relatively easy to define and test the tradeoff between protection and run-time of an image.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that, when encrypting a portion of an image, it may be relatively easy to define and test the tradeoff between protection and runtime of an image. An embodiment of the invention may secure the image data at rest, and so the image may be put in public domain or backup sites in a secure way. An embodiment of the invention may provide for selective encryption of an image in such a way that there is little or not impact on an associated deployment environment for the image. An embodiment of the invention may implement selective encryption of an image in such a way that the impact to startup of a full working time is not materially affected.

A. Aspects of An Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, the creation, modification, encryption, and/or decryption, of one or more container images. More generally, the scope of the invention embraces any operating environment in which the disclosed concepts may be useful.

Embodiments of the invention may be employed in connection with container-based platforms such as Docker, although no particular platform is required to be employed in any embodiment. Container-based platforms may involve or include deployment environments such as cloud computing environments. Example cloud computing environments with which example embodiments of the invention may be employed include, but are not limited to, DellEMC Cloud, Microsoft Azure, Amazon AWS, and Google Cloud. More generally however, the scope of the invention is not limited to employment of any particular type or implementation of cloud computing environment.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

B. Overview of Images and Associated Processes

Following is a discussion that may provide context for one or more embodiments of the invention. While the following discussion makes reference to aspects of the Docker platform, the scope of the invention is not limited to that particular platform. More generally, embodiments of the invention may be employed in connection with any container definition and deployment environment, and associated images, files, and components. The following discussion is not intended to limit the scope of the invention in any way.

In general, and with reference to the example of FIG. 1, an image 100, such as a Docker image for example, may refer to a combination of files grouped into layers such as layers 102, 104 and 106, that are defined in a file, such as a Dockerfile in the Docker platform for example. A Dockerfile describes the base image, as well as the additional layers the image will be composed of. Each command in a Dockerfile may result in an additional layer. A command that does not modify the image file system may be considered as an empty layer, and the metadata of the commands may be kept in build history within a Docker image configuration file. Each Docker image may have an image configuration file that describes various parameters of the image itself such as, for example, the layer the image is composed of, and identification of the entry point, for example, where identification of the entry point refers to the command to run after instantiation of the container.

A Docker Engine may be employed that comprises technology that provides the ability to run containers on any host regardless of the host OS. Each Docker image may be a template of a light weight OS and can be supplemented with application and data files, for example. Thus, an image such as a Docker image may comprise a file collection that can be run on a Docker engine or any other platform that supports images, such as the Kubernetes platform that supports Docker images.

Example embodiments may operate in connection with a Docker image registry. In general, a Docker registry may comprise a repository that stores the layers that collectively form a Docker image. Such a registry may store the image configuration and layers as blobs in zipped fashion with plain text data inside. A registry may provide an application program interface (API) to pull and push Docker images. There are native Docker registries, and other products like Artifactory, also provide Docker registry functionality.

A registry such as the Docker registry may keep manifests of all images in the registry. A manifest may hold data about what image configuration to use, and the layers that may be used to construct the image. For example, the Docker hub is a public domain docker registry that stores Docker images for public use. Many use cases and products may rely on this registry to hold their production images which can be used for deployment in AWS or Azure or any other platform.

In general, deployment refers to a process that instantiates an image such as a Docker image to obtain a running process on an engine such as a Docker engine, and to run a containerized application. Deployments may be implemented on any host with the Docker engine or any other platform that supports and orchestrates images such as Docker images. A deployment environment may make a copy of the image from a registry and keep the copy of the image locally.

While images provide useful functionality, they are vulnerable to threats. For example, any data that is stored in a DB, Artifactory or local files is exposed to a risk of data theft, especially in public domains that can be breached. Additionally, there is a risk in private environments as well. Data can be stolen when the data is in a production environment or in some backup environments. Following is a more detailed discussion of some of the shortcomings of some images.

One characteristic of images, such as Docker images, that may make them vulnerable, such as to unauthorized access, is that Docker images are plain text files stored on disk. Thus, an attacker that can obtain the disk, breach the file system, or intercept the movement of a Docker image from one location to the other, and thereby obtain the data stored in a Docker image.

As well, encryption and decryption processes such as may be employed with images may generally be relatively slow. This may be due to the use of algorithms that rely on complex mathematical functions. Data modification, such as 10 operations, and mechanisms to protect against brute force may can be relatively slow on encryption/decryption process. Thus, decryption of a full image can be slow, and will slow the performance of the deployment system.

Further, container deployment environments may be performance sensitive. For example, deployment environments that use microservices architectures are constantly scaling or instantiating new containerized services. Anything that slows down these processes, such as image encryption and decryption, may adversely impact the system recovery and/or the system functionality. This, in turn, may result in a poor user experience and/or a slow system.

Moreover, conventional approaches to image security require modification of the deployment environment where the image is deployed. For example, encrypting the entire image, or encrypting each layer individually, requires support from the deployment environment. Such support is not present in most of the existing deployment environments and, even if present, may complicate and slow the deployment and operation processes. The process may be complicated further if the deployment environment does not have decryption capabilities, since the image may then have to be sent to a third party for decryption, which can result in delays to deployment of the container.

Finally, conventional approaches to image decryption may require support by the deployment environment, particularly, by an orchestrator before the image is sent to a target host for execution. Thus, the host which runs the application receives the image in an unencrypted form, which may make sensitive data in the image vulnerable to host access attacks.

C. Aspects of Example Embodiments

By way of introduction, the following observations may be pertinent to one or more example embodiments. First, decrypting a full image at an orchestrator or the host involves storing an unencrypted, and therefore vulnerable, image. As well, decryption of the full image may require modifications to the runtime environment. Further, the base image, which may comprise or consist of the OS (operating system), may not comprise sensitive data and, as such, there may be little value in encrypting the base image. An image may comprise other layers as well for which encryption may not be necessary or useful, where such layers may include, but are not limited to, Apache Tomcat, Java, routers/proxies, databases, and/or, other application level services. Finally, the OS and base application services may collectively comprise a relatively large percentage of the overall size of a container image. As such, avoiding the encryption of the OS and related services may allow the container to run without requiring modifications to the deployment environment, and may significantly reduce the size of the encrypted portions of the image.

Thus, embodiments of the invention may provide a user with simple control over what image layers to encrypt, and may enable a user to build a mechanism to decrypt only those layers without requiring the support of the deployment environment. Accordingly, example embodiments comprise a new secured image, such as a Docker image for example, that has only the sensitive data encrypted. Thus, the relatively large base image of unsensitive data may remain in plain text format, but data that is considered as sensitive may be kept encrypted. The decryption process may be implemented at runtime by a decryptor that is added, as a layer, to the image and that may decrypt the encrypted image data before executing the original application of which the container is a part.

In general, some example embodiments may involve marking the data to be encrypted. In the context of an image, such marking may involved modifying, for example, the Docker file of the image in order to mark the particular layer, or layers, of the Docker file to be encrypted. For example, within a Docker file, just above the command layer(s) that are to be marked for encryption, a command may be inserted to signal where encryption should begin. One example of such a command is:

RUN echo "=========START ENCRYPTION========"

The inclusion of a command such as this may result in the creation of an empty layer that holds the command in the history of the layers within the Docker image configuration file.

Note that the invention is not limited to the particular example string noted above. Any sequence that signals where encryption should begin may be employed. It is also noted that while 'RUN echo' results in the creation of an empty layer, various other commands may be employed. Further, commands that create a layer that is not empty may alternatively be employed, although such commands may not be well suited for some circumstances. In general then, any layer agreed to in advance may be implemented as one of a group of one or more signal layers. However, the use of a trivial empty layer, such as the one that may be created with the 'RUN echo' command, may be simple, and may function with no additional limitations.

During the image encryption process, the system may traverse the layers of the image until the signal layer, such as the command layer noted above, is located. The system may then know to encrypt at least one of the layers following the signal layer. This approach may thus enable the marking of any one or more image layers for encryption, and may help to optimize a tradeoff between data protection and runtime constraints.

Figure 2:
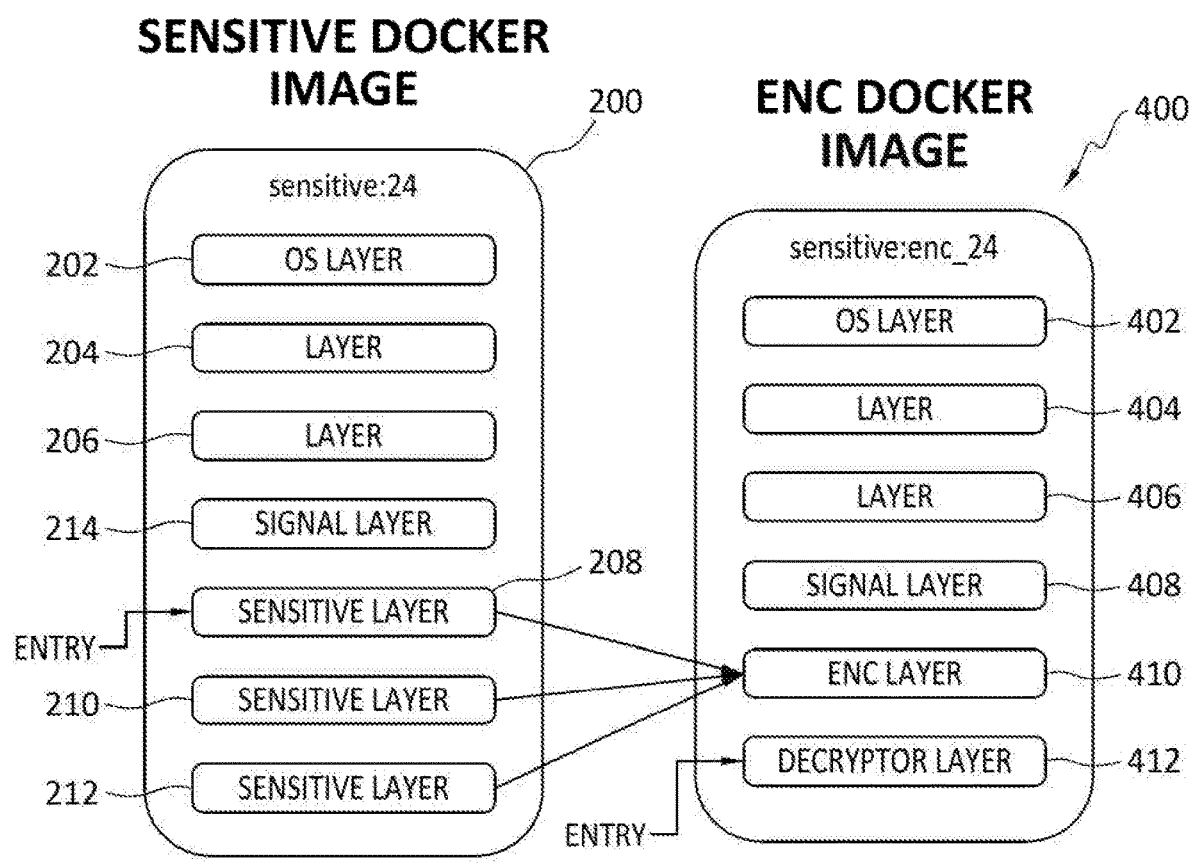
FIG. 2 discloses aspects of an example image that includes sensitive information, and an example encrypted image.

With attention now to FIG. 2, details are provided concerning image configurations before, and after, encryption. As shown in FIG. 2, an image 200 may include a combination of layers. Some of the layers, such as the OS layer 202, and layers 204 and 206, may comprise data that is not sensitive, and may thus not require encryption. As such, those layers may be referred to as non-sensitive layers. No particular number, or type, of non-sensitive layers 202, 204, and 206, is required. The image 200 may be referred to as a sensitive image when it includes one or more layers comprising sensitive information.

Note that in some embodiments, a non-sensitive layer may comprise some sensitive information, but the designation of that layer as non-sensitive may reflect a judgment that the potential risk of exposure of that sensitive information is outweighed by the cost of additional processing that would be required to protect that non-sensitive layer, and/or by other considerations. As well, a sensitive layer, discussed below, may include some non-sensitive information, but the designation of that layer as sensitive may reflect a judgment that, on the whole, it is desirable to encrypt that non-sensitive information since the encryption of that non-sensitive information may not impose any material processing burden on the system and such burden, in any case, may be outweighed by the need to protect the sensitive information in that sensitive layer.

The image 200 may additionally include one or more layers, such as the sensitive layers 208, 210, and 212, that include sensitive information that may require encryption. No particular number, or type, of sensitive layers 208, 210, and 212, is required. Whether or not particular data or information is sensitive may be defined by a user, administrator, or any other entity. Such an entity may be a human, or a computing system. In general, sensitive information embraces any information that is desired to be kept confidential, or at least subject to limited dissemination and/or availability, for whatever reason(s). In some instances, sensitive information may comprise user-specific, and/or system-specific information, that is not publicly available. Sensitive information may comprise proprietary financial and technical information of a business enterprise.

As also indicated in FIG. 2, the image 200 may include one or more signal layers 214. In general, the signal layer 214 may indicate to the system that any layer(s) following the signal layer 214 should be encrypted. In general, the signal layer 214 may serve as a notification to indicate the beginning of one or more layers that are to be considered as sensitive. Thus, in some embodiments, one, some, or all, of the layers preceding the signal layer may be non-sensitive, and one, some, or all, of the layers following the signal layer may be sensitive. The layers of the image may, in some embodiments, be considered as defining at least two points in time, namely, a point in time prior to the signal layer, and a point in time following the signal layer. As noted elsewhere herein, some other embodiments provide for an image with multiple signal layers and multiple groups of one or more non-sensitive layers and/or multiple groups of one or more sensitive layers. In some embodiments, the signal layer 214 may have an identifier that marks it as a signal layer so that the signal layer 214 can be understood by the system as the system traverses the layers of the image 200. While the illustrated example includes only one signal layer 214, it should be understood that there is no limit to the number of signal layers 214 that may be employed in an image. For example, in one alternative image configuration, an unencrypted image may have the following top-down configuration: LAYER; LAYER; LAYER; SIGNAL LAYER; SENSITIVE LAYER; SENSITIVE LAYER; STOP ENCRYPTION LAYER; LAYER; LAYER; SIGNAL LAYER; SENSITIVE LAYER; STOP ENCRYPTION LAYER. More generally, a sensitive, unencrypted image may have any number, and combination, of layers, signal layers, and stop encryption layers. Thus, the example image configurations disclosed herein are provided only by way of illustration and are not intended to limit the scope of the invention in any way.

Figure 3:
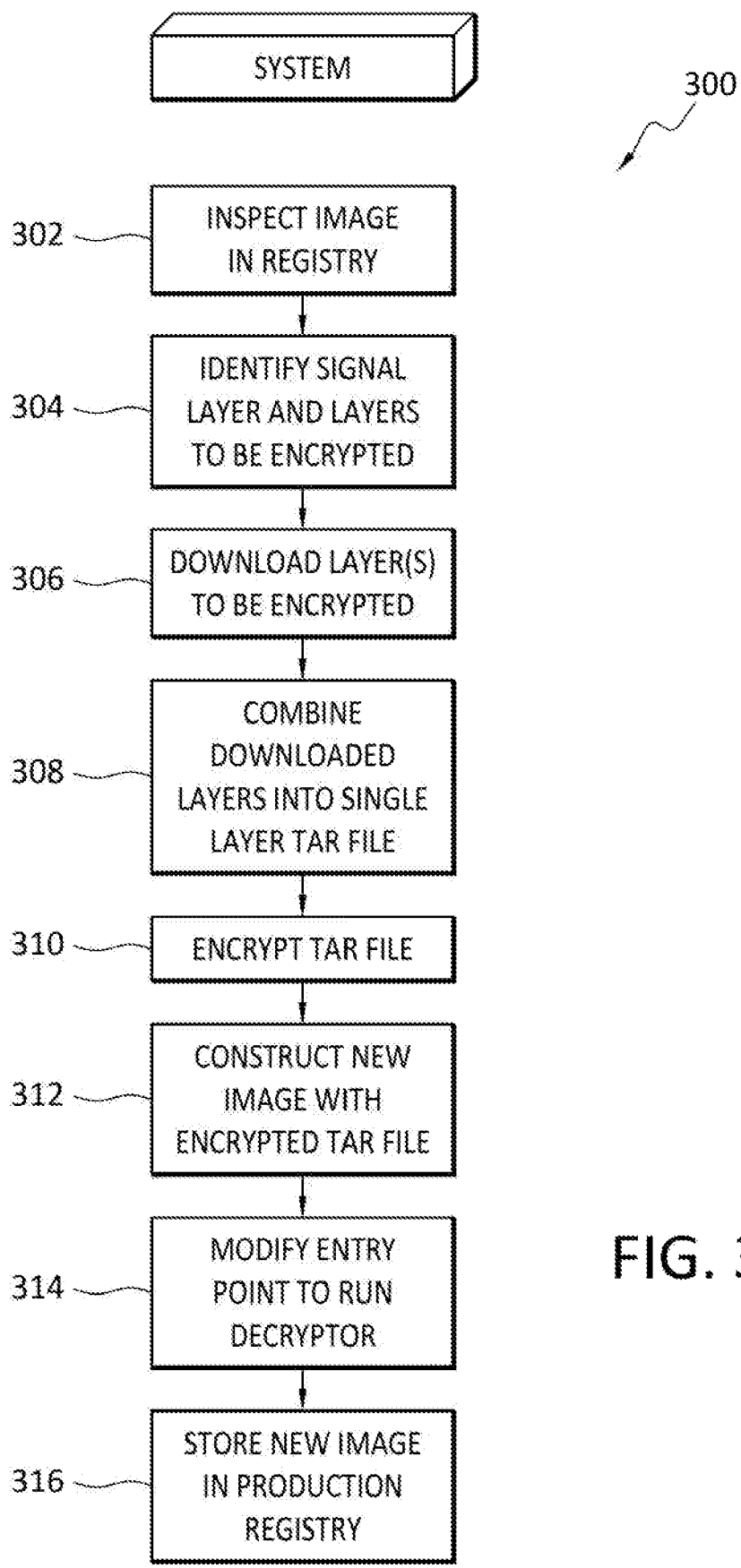
FIG. 3 discloses an example method for encryption of an image.

With continued reference to FIG. 2, and directing attention now to FIG. 3 as well, an example method, generally denoted at 300, is disclosed for selective encryption of a container image. Execution of the method 300 may produce an encrypted docker image 400, as shown in FIG. 2 and discussed below.

The example method 300 may begin with inspection 302 of an image, which may have an image name, in a registry, such as a Docker registry. The image may be located in the registry by searching for the image name. As a result of the inspection 302, one or more signal layers and/or one or more layers to be encrypted may be identified 304. The layer, or layers, to be encrypted may then be downloaded 306.

The downloaded layers, if there are more than one, may then be combined together to create a single layer file, such as a .TAR file 308, for example. As used herein, a .TAR file refers to an archive that may be created by the Unix-based TAR utility. A TAR file is an archive created by TAR, a Unix-based utility that operates to package files together. The .TAR file may contains multiple files, which may be stored in an uncompressed format, and the .TAR file may also comprise metadata concerning the archive. The .TAR files may be compressed into .GZ files using GNU Zip compression. The scope of the invention is not limited to TAR files however, and any other suitable files and platforms for creating those files may alternatively be used. After the .TAR file has been created 308, it may then be encrypted 310 using any suitable encryption algorithm.

Next, a new image may be created 312 that includes the encrypted .TAR file. The new image may also include the non-sensitive data layer(s) of the original, unencrypted image, one or more signal layers, and a decryptor layer. The entry point of the original image may be modified 314 so that the decryptor layer of the new image runs first when the new image is instantiated. After the decryptor layer has run, the original entry point may then be called. After the entry point has been modified 314, the new image may then be stored in a production registry 316. At this point, the new image may be ready for use in a production environment.

Returning once more to FIG. 2, the image 400 is an example of a new image that may be created, such as by way of the example method 300. As the image 400 may include one or more encrypted layers, the image 400 may be referred to as being encrypted, although not all the layers of the image 400 may be encrypted.

In the example of FIG. 2, the image 400 includes non-sensitive layers such as OS layer 402, and layers 404, and 406, which may be copies or restorations of, respectively, OS layer 202, and layers 204, and 206, of the image 200. As well, the image 400 may include a signal layer 408 that may be a copy or restoration of the signal layer 214. The signal layer 408 may indicate to the system that the encrypted layer 410 should be decrypted by the decryptor layer 412. Because the decryptor layer 412 may be defined as the entry point, as shown in FIG. 2, the decryptor layer 412 may run first when the image 400 is instantiated. After the decryptor layer 412 has run, the original entry point, as shown in the image 200, may be called.

Thus, the image 400 that is generated, such as by the method 300, based on the original image 200 may comprise a self-contained decryptable image. As such, the image 400 may not rely on any outside processes, entities, or services, to decrypt the sensitive information in the image 400, or to perform the other functions of the image 400. Rather, the image 400 performs its own decryption of its encrypted layer 410. Moreover, because the sensitive information may remain encrypted until runtime, the image 400 may provide assurance as to the security of that sensitive information.

Upon deployment, the system may use the new encrypted image 400 and provide the decryption key through standard secret handling. In Docker Swarm, for example, the system may use the secrets mechanism, or in Kubernetes use the ETCD and secrets mechanism.

With continued attention to the example encrypted image 400 of FIG. 2, further details are provided concerning a decryptor, such as the example decryptor layer 412. In some embodiments, the decryptor layer comprises a decryptor application in the form of a small Linux based executable that performs the decryption of the encrypted .TAR file to the container local file system. The decryptor may also open the .TAR file to restore the sensitive layers 208, 210 and 212 of the original image 200 to the image 400. Prior to exiting, the decryptor may transfer control to the original entry point, that is, the entry point given before the image was encrypted, and as shown in the example image 200. Operation of the decryptor layer 412 to decrypt the encrypted layer 410 and open the .TAR file may be performed automatically upon instantiation of the new image.

Because the decryptor may be part of image, rather than being provided as a third party service for example, no support is needed from the runtime environment. Rather, the decryptor may run as part of the standard container initialization and may therefore transparent to the runtime system and to the image layers themselves. It is noted that OSs other than Linux may be supported in a similar fashion in alternative embodiments.

As disclosed earlier, an image, such as the example image 400 for example, may comprise multiple separate encryption layers, such as the encryption layer 410. Such a configuration may be implemented by adding the following command:

RUN echo "=========STOP ENCRYP-
TION======="

to identify layers that may be plain text. The signal layer 408 and stop-signal layer may be repeated multiple times in a given image 400. In at least some embodiments, there may be only one decryptor executable layer in the final image, regardless of how many encrypted layers may exist. This decryptor layer may decrypt all the encrypted layers prior to calling the original entry point. Care should be used using multiple layers, as in-between plain text layers may be a source for leakage of sensitive information. That said, if there are encrypted layers that are common to multiple containers, these encrypted layers may be shared in this way in their encrypted form, thus maintaining bandwidth efficiency during download despite the fact that the layers are encrypted.

While an OS layer of an image, such as the example image 200 for example, may not be encrypted in some embodiments, there may be a need in other embodiments to encrypt the OS layer. If there is a need to encrypt the OS layer and/or other non-sensitive layers, such as the layers 202, 204, and 206, for example, a boot loader layer may be added to the OS layer solely to run the decryptor. The boot loader layer may only need to have enough functionality to run the decryptor, and no more. This approach will still make encryption and decryption transparent to the deployment environment, but the runtime decryption may take longer as the OS, which is typically large in size, will also be decrypted prior to instantiation of the image. As well, if the OS layer and/or other non-sensitive layers are encrypted, the container environment variables that are used to pass runtime parameters to the application, may need to be transferred from the loader environment to the spun-off, decrypted OS.

As disclosed herein then, example embodiments embrace, among other things, encryption and decryption of images, such as Docker images for example. Such embodiments may use a Docker file and embedded decryptor to simplify management, and make the Docker image portable to various different runtime environments. Example embodiments of the invention may include various attributes such as that they are relatively simple to use, may be instantiated efficiently at runtime, may avoid the need for changes or accommodation in the runtime environment, and may be transparent to the container, the runtime environment, and/or, to the administrator. Some particular embodiments may employ a signal layer as a marker to identify which layer(s) is/are to be encrypted. Some embodiments may embed a decryptor in an encrypted image which may run prior to an original entry point that was specified for the unencrypted image. Some embodiments may support multiple encryption layers. Finally, some embodiments may provide for encryption of an OS and/or other non-sensitive information.

D. Further Example Embodiments

Following are some further example embodiments of the invention. These are presented only by way of example and are not intended to limit the scope of the invention in any way.

Embodiment 1. A method, comprising: inserting a signal layer in an image, the signal layer indicating that a sensitive layer in the image is a candidate for encryption; creating a single layer archive file that includes the sensitive layer; encrypting the single layer archive file to create an encrypted layer; constructing a new image that includes the encrypted layer; inserting, in the new image, a decryptor layer that is operable to decrypt the encrypted layer; and designating the decryptor layer as an entry point of the new image.

Embodiment 2. The method as recited in embodiment 1, wherein the new image further comprises: a signal layer; and an unencrypted non-sensitive layer.

Embodiment 3. The method as recited in any of embodiments 1-2, further comprising restoring one or more non-sensitive layers from the image to the new image.

Embodiment 4. The method as recited in any of embodiments 1-3, wherein the single layer archive file comprises multiple sensitive layers of the image.

Embodiment 5. The method as recited in any of embodiments 1-4, further comprising traversing the image to identify the signal layer and the sensitive layer.

Embodiment 6. The method as recited in any of embodiments 1-5, wherein the new image is configured to call an original entry point after decryption of the encrypted layer has been performed by the decryptor layer.

Embodiment 7. The method as recited in any of embodiments 1-6, further comprising instantiating the new image by performing operations comprising: running the decryption layer to decrypt the encrypted layer, open the single layer archive file, and restore the sensitive layer of the image from the single layer archive file to the new image; and after decryption of the encrypted layer, running one or more layers of the new image.

Embodiment 8. The method as recited in any of embodiments 1-7, wherein the image comprises a stop encryption layer that defines where, in the image, encryption ends.

Embodiment 9. The method as recited in any of embodiments 1-8, wherein one or both of the image and the new image is a Docker image.

Embodiment 10. The method as recited in any of embodiments 1-9, wherein the new image does not require a process external to the new image to perform decryption of the encrypted layer.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of embodiments 1 through 11.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
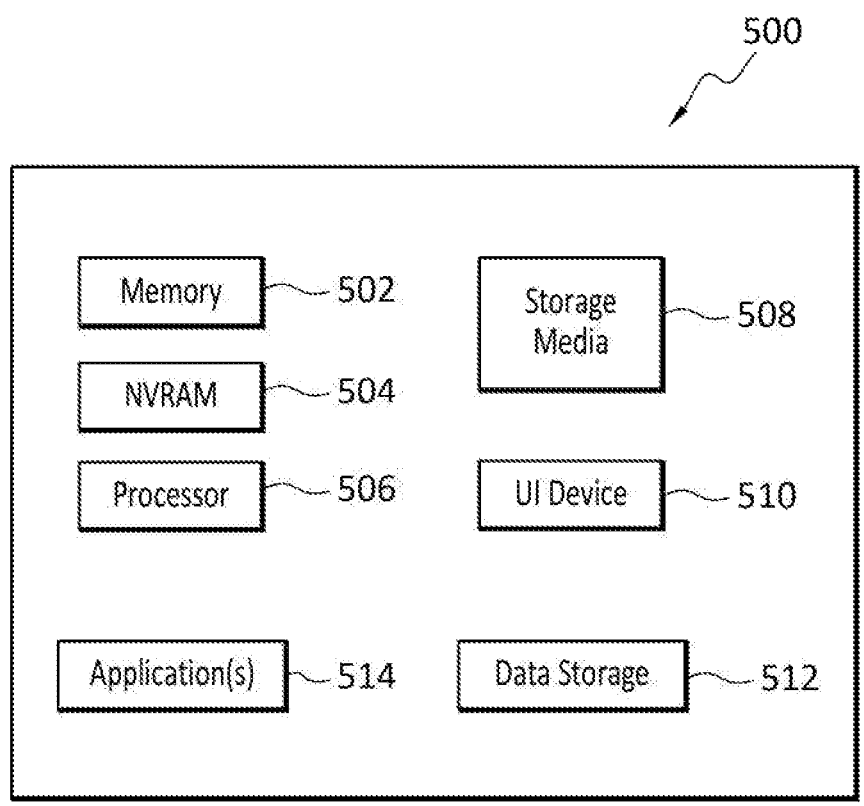
FIG. 4 discloses aspects of an example computing entity.

With reference briefly now to FIG. 4, any one or more of the entities disclosed, or implied, by FIGS. 1-3 and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 4.

In the example of FIG. 4, the physical computing device 500 includes a memory 502 which may include one, some, or all, of random access memory (RAM), non-volatile random access memory (NVRAM) 504, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
inserting a signal layer in an image which, when instantiated, is executable on an engine that is operable to build and containerize an application, the signal layer indicating that a sensitive layer in the image is a candidate for encryption;
creating a single layer archive file that includes the sensitive layer;
encrypting the single layer archive file to create an encrypted layer;
constructing a new image that includes the encrypted layer;
inserting, in the new image, a decryptor layer that is operable to decrypt the encrypted layer; and
designating the decryptor layer as an entry point of the new image so that the decryptor layer of the new image runs first when the new image is instantiated.

2. The method as recited in claim 1, wherein the new image further comprises:
a signal layer; and
an unencrypted non-sensitive layer.

3. The method as recited in claim 1, further comprising restoring one or more non-sensitive layers from the image to the new image.

4. The method as recited in claim 1, wherein the single layer archive file comprises multiple sensitive layers of the image.

5. The method as recited in claim 1, further comprising traversing the image to identify the signal layer and the sensitive layer.

6. The method as recited in claim 1, wherein the new image is configured to call an original entry point after decryption of the encrypted layer has been performed by the decryptor layer.

7. The method as recited in claim 1, further comprising instantiating the new image by performing operations comprising:
running the decryption layer to decrypt the encrypted layer, open the single layer archive file, and restore the sensitive layer of the image from the single layer archive file to the new image; and
after decryption of the encrypted layer, running one or more layers of the new image.

8. The method as recited in claim 1, wherein the image comprises a stop encryption layer that defines where, in the image, encryption ends.

9. The method as recited in claim 1, wherein one or both of the image and the new image is a Docker image.

10. The method as recited in claim 1, wherein the new image does not require a process external to the new image to perform decryption of the encrypted layer.

11. A non-transitory storage medium having stored therein instructions that are executable by one or more hardware processors to perform operations comprising:
inserting a signal layer in an image which, when instantiated, is executable on an engine that is operable to build and containerize an application, the signal layer indicating that a sensitive layer in the image is a candidate for encryption;
creating a single layer archive file that includes the sensitive layer;
encrypting the single layer archive file to create an encrypted layer;
constructing a new image that includes the encrypted layer;
inserting, in the new image, a decryptor layer that is operable to decrypt the encrypted layer; and
designating the decryptor layer as an entry point of the new image so that the decryptor layer of the new image runs first when the new image is instantiated.

12. The non-transitory storage medium as recited in claim 11, wherein the new image further comprises:
a signal layer; and
an unencrypted non-sensitive layer.

13. The non-transitory storage medium as recited in claim 11, wherein the operations further comprise restoring one or more non-sensitive layers from the image to the new image.

14. The non-transitory storage medium as recited in claim 11, wherein the single layer archive file comprises multiple sensitive layers of the image.

15. The non-transitory storage medium as recited in claim 11, wherein the operations further comprise traversing the image to identify the signal layer and the sensitive layer.

16. The non-transitory storage medium as recited in claim 11, wherein the new image is configured to call an original entry point after decryption of the encrypted layer has been performed by the decryptor layer.

17. The non-transitory storage medium as recited in claim 11, wherein the operations further comprise instantiating the new image by performing additional operations comprising:
running the decryption layer to decrypt the encrypted layer, open the single layer archive file, and restore the sensitive layer of the image from the single layer archive file to the new image; and
after decryption of the encrypted layer, running one or more layers of the new image.

18. The non-transitory storage medium as recited in claim 11, wherein the image comprises a stop encryption layer that defines where, in the image, encryption ends.

19. The non-transitory storage medium as recited in claim 11, wherein one or both of the image and the new image is a Docker image.

20. The non-transitory storage medium as recited in claim 11, wherein the new image does not require a process external to the new image to perform decryption of the encrypted layer.

* * * * *